United States Patent [19]

Dichiara

[11] Patent Number: 4,890,285
[45] Date of Patent: Dec. 26, 1989

[54] CYCLE COUNTER FOR TIMEOUT MICRODIAGNOSTICS

[75] Inventor: Peter M. Dichiara, Arlington, Mass.

[73] Assignee: Digital Equipment Corporation, Maynard, Mass.

[21] Appl. No.: 176,784

[22] Filed: Apr. 1, 1988

[51] Int. Cl.⁴ .............................................. G06F 11/04
[52] U.S. Cl. ..................................... 371/16.2; 364/900
[58] Field of Search ....................... 371/12, 62, 21, 66, 371/61, 20; 364/200, 900

[56] References Cited

U.S. PATENT DOCUMENTS

| | | | |
|---|---|---|---|
| 4,538,273 | 8/1985 | Lasser | 371/12 |
| 4,611,271 | 9/1986 | Hattori | 371/12 |
| 4,696,002 | 9/1987 | Schleupen | 371/12 |
| 4,752,930 | 6/1988 | Kitamura | 371/12 |
| 4,803,682 | 2/1989 | Hara | 371/12 |

Primary Examiner—Michael R. Fleming
Attorney, Agent, or Firm—Kenyon & Kenyon

[57] ABSTRACT

A method and apparatus for reducing the console interaction time in the performing of microdiagnostic tests on a central processing unit. A microdiagnostic code RAM operates the microdiagnostic code in the central processing unit. The microdiagnostic code RAM performs tests on the CPU. The microdiagnostic also loads a cycle counter with a value from the microdiagnostic code. At the beginning of a test, the cycle counter is initialized and begins counting. If the cycle counter reaches the previously loaded value before completion of the test, a machine-check trap occurs allowing the microdiagnostic code RAM to gain control of the test regardless of any error conditions that are present.

7 Claims, 1 Drawing Sheet

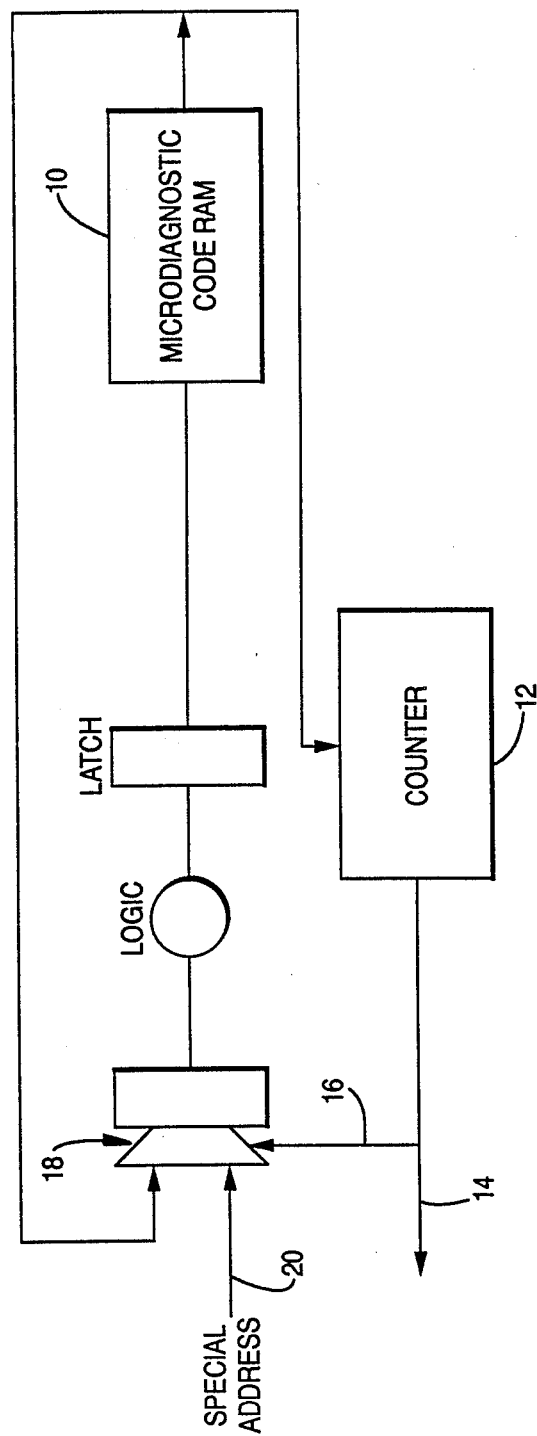

CYCLE COUNTER FOR TIMEOUT MICRODIAGNOSTICS

FIELD OF THE INVENTION

The present invention relates to the field of central processing units (CPU) and, more particularly, to decreasing the microdiagnostic test time required for a central processing unit.

BACKGROUND OF THE INVENTION

In general, microdiagnostics are used to test a CPU. Usually, a console processor loads the test microcode and initializes the machine. The test microcode uses a bottom-up strategy to perform tests on the machine itself during its start-up.

The bottom-up strategy begins by performing the lowest level test such as a check on the console interface. If the test result such as a check on the console interface. If the test result is positive, the next higher level test is performed. As each test result returns positive, the microdiagnostic performs higher level tests, thus relying on previously checked parts of the machine to perform subsequent tests. For example, the microdiagnostics can initially check the microcode sequencer in the instruction box. If the sequencer is working properly, subsequent tests are performed on the execution box, floating-point box, caches, etc. utilizing the instruction box to perform the tests. By using the microcode to operate in the machine itself, a very fast test engine is developed as opposed to the use of a relatively slow console.

The use of microdiagnostics in conjunction with the cycle counter addressed the undesirably large CPU microdiagnostic test time problems that field service engineers, module repair centers, quality verification and initial stage manufacturing were experiencing. Any additional test time translates directly into extra costs for producing and maintaining a CPU.

SUMMARY OF THE INVENTION

The present invention significantly reduces the microdiagnostic test time for a CPU. The invention takes advantage of the finding that by reducing the microdiagnostic's console interaction with the tests to a minimum level, significant test speed-up is obtained.

Console interaction with microdiagnostic microcode is used for several reasons. First, the console is used as a controlling mechanism for verifying the operation of the main microsequencer and control store. An autonomous microdiagnostic is not yet feasible at this point of the test sequence.

Second, the console is used as a testing mechanism. Often the design of a console controlled microdiagnostic is less complex than the design of an equivalent, so called "autonomous" microdiagnostic. Autonomous meaning in relation to the console as the testing control mechanism. The initial loading of the microdiagnostic is not considered a test mechanism.

Thirdly, the console interaction with the microdiagnostic is used in several cases where the microarchitecture of the machine does not provide sufficient observability for good isolation of the logic.

The invention provides for the use of a special test hook that allows the microarchitecture itself to sufficiently control a logic piece test and thus reduce the need for console interaction for certain control functions. The special test hook of this invention is a cycle counter for timeout microdiagnostics that speeds up the microdiagnostic package. The cycle counter is a hardware test circuit implemented to decrease the CPU level test time.

BRIEF DESCRIPTION OF THE DRAWING

The FIGURE is a hardware block diagram of a cycle counter test circuit in accordance with the present invention.

DETAILED DESCRIPTION

The cycle counter for timeout microdiagnostics of the present invention significantly decreases the diagnostic test time of the CPU. CPU's are subject to a "stall" condition. Stalls occur for various reasons. One example of when the machine would stall is when an attempt is made to read data not yet available from a cache. In this instance, the machine must wait for the data to arrive in the cache before proceeding with the test. When this occurs, the clocks to the machine are deasserted, thus freezing the machine until the data arrives. Once the data is available, the clocks are again asserted and the machine processes the data as though nothing ever happened.

A problem arises in diagnostics when the device that fetches the data is inoperative. Because the microdiagnostic is performing the test, the machine will be stalled indefinitely while waiting for the data. There is nothing that allows the microdiagnostic to continue the test or to check the state of the machine after the clock has been deasserted.

The cycle counter for timeout microdiagnostics of the present invention alleviates the problem by providing a counter in the machine which is programmable to break a stalled condition after a programmed number of cycles has elapsed.

The type of signals that the cycle counter helps test are time critical signals. Time critical signals are signals occurring at a precise number of cycles after a given event which remain asserted for only a given number of cycles. Past implementations tested these signals by running special test microcode in a highly controlled fashion. The microcode would be run for a few cycles and then stopped while the state of the machine is checked. Next, the microcode would again be run for a few more cycles and then stopped again. This sequence would continue until everything was checked. Unfortunately, the microcode control necessary to operate the CPU in this highly controlled fashion is supplied from the console thus adding to the overall test time due to the need for console interaction.

A bursting of the clocks provided a means for past microdiagnostics to determine how many cpu cycles had occurred. The console would issue a command to "burst clock x times" which allowed the microdiagnostic to keep track of time. After the command was completed and the clocks again deasserted, the microdiagnostic would then issue more console commands to determine if an error condition occurred. An example is a test performed to check whether a clock stall was correctly deasserted.

The cycle counter uses existing, functional hardware to provide an alternate means for controlling the testing of time critical signals. The cycle counter keeps the watchdog control necessary to perform a test within the operability of the main microsequencer thereby eliminating the need for console interaction.

Referring to the FIGURE, there is shown a block diagram of the cycle counter for timeout microdiagnostics. The microdiagnostic code RAM 10 contains the diagnostic microcode. A counter 12 is loaded with a value by the microdiagnostic. The value loaded into the counter exceeds the time necessary to complete the test. The microdiagnostic utilizes a trap logic operation at timeout of the counter to break the stall and continue its diagnostic tests. A trap is a known mechanism to detect and correct improper operation of a CPU. Ordinarily, when a trap occurs, the trap logic detects the improper operation and issues a trap handler address. The trap handler address locates a microsubroutine to deal with the trap condition.

As discussed, in operation, a value is loaded into the counter 12 by the microdiagnostic code RAM 10. Next, the counter 12 is instructed by the microdiagnostic code RAM 10 to start counting. After a number of cycles corresponding to the previously loaded value, the counter times-out or overflows. This sends a signal on line 14 which breaks the stall and causes a machine-check microtrap. The microtrap allows the main microsequencer to regain control of the machine from the stalled condition regardless of the error condition present e.g. a stall wire being stuck in the high position. More specifically, the time out signal on the line 14 reasserts the clock and also operates a select port for a multiplexer 18 to select an input line 20 which inputs a special address to the microdiagnostic code RAM 10 at time out. The special address locates a machine check trap location that contains suitable microcode. The microcode at the machine check trap location is diagnostic microcode and performs the steps for the diagnostic which are necessary to diagnose the error condition. Thus, the use of the counter 12 enables the microdiagnostic code RAM 10 to break the stall and continue microdiagnostics without the need for console interaction.

The cycle counter takes advantage of the order in the microdiagnostic sequence where the time critical signals are tested. Time critical signals are generally tested late in the microdiagnostic sequence. This allows the microdiagnostic to use the microtrap logic, which is necessary for proper cycle counter operation, as well as the arithmetic logic unit, the related execution box and the caches.

The following simplified pseudo-code for both the console commands and the microcode provides an example of the testing of a stall wire. The example illustrate the differences between the previous console method and the cycle counter method.

EXAMPLE 1—Console Method

| CONSOLE COMMANDS | |
|---|---|
| Load microcode | !shown below |
| Load upc, starting.upc | !load micro pc |
| Burst clk X cycles | !enough time to |

-continued

| CONSOLE COMMANDS | |
|---|---|
| | !cause the stall |
| | !condition to assert |
| | !stall; thus freezing the |
| | !microsequencer |
| | !temporarily for a given |
| | !number of cycles. |
| Read upc, upc_buffer1 | !Read the upc to make |
| | !certain code has not |
| | !stalled prematurely |
| Burst clk Y cycles | !Y cycles is the number of |
| | !cycles that the stall |
| | !should be asserted if |
| | !working correctly. |
| Read upc, upc_buffer2 | !Read the upc to make |
| | !certain that the |
| | !microsequencer has |
| | !remained frozen the |
| | !proper number of cycles |
| Burst clk 1 cycle | !Make certain that the |
| | !microsequencer hasn't |
| | !remained frozen longer |
| | !than it should have. |
| Read upc, upc_buffer3 | !upc should not be |
| | !frozen |
| some_form_of_compare_routine | !this will compare the |
| | !upc's in the upc buffers |
| | !to there expected value. |
| | !Any inequalities will |
| | !result in an error |
| | !callout. |

| MICROCODE PORTION |
|---|
| starting.upc: |
| ;------------------------------; |
| some form of set up microcode |
| ;------------------------------; |
| va <— some value |
| read mem [mem reg0] |
| ;------------------------------; |
| nop |
| label.that.we.stall.at.for.Y.cycles: |
| ;------------------------------; |
| r0 <—mem reg 0 ; use read |
|                        ; result this |
|                        ; should be the |
|                        ; upc we stall |
|                        ; at. |
| label.that.we.should.be.at.after.Y+1.cycles: |
| ;------------------------------; |
| nop |
| . |
| . |
| . |

EXAMPLE 2—Cycle Counter for Timeout Microdiagnostics

| CONSOLE COMMANDS | |
|---|---|
| Load microcode | !shown below |
| Load upc, starting.upc | !load micro pc |
| Wait for test to signal successful or error completion, via TX traffic. | |

| MICROCODE PORTION |
|---|
| starting.upc: |
| ;------------------------------; |
| some form of set up microcode; slightly |
|                                        ; different than |
|                                        ; above set up |
|                                        ; code |

-continued

| MICROCODE PORTION |
|---|

```
                                              .
                                              .
                                              .
                    ;----------------------------; r1 serves as a
                                      r1 <— 0;  microcode
                                              ;  counter
                    ;----------------------------;
cycle counter <— valve corresponding to (Y+4); Y+2 cycles
                                              ;  after the
                                              ;  read a
                                              ;  machine
                                              ;  check will
                                              ;  occur,
                                              ;  regardless
                                              ;  of stalls
                    ;----------------------------;
                              va <— some value
                              read mem [mem reg0]
                    ;----------------------------;
                                            nop
label.that.we.should.stall.at.for.Y.cycles:
                    ;----------------------------;
                                 r0 <— mem reg0; use read
                                              ;  result this
                                              ;  should be the
                                              ;  upc we stall
                                              ;  at.
label.that.we.should.be.at.after.Y=1.cycles:
                    ;----------------------------; if the machine
                                    r1 <— r1 + 1; is working
                                              ;  correctly,
                                              ;  this cycle
                                              ;  will execute
                                              ;  and the next
                                              ;  cycle will be
                                              ;  the
                                              ;  machinecheck
                                              ;  trap entry.
                                              ;  If the stall
                                              ;  remained
                                              ;  asserted too
                                              ;  long this
                                              ;  missing
                                                 before
                                              ;  the trap
                                              ;  happened This
                                              ;  is detectable
                                              ;  as r1 still
                                              ;  being a 0
                    ;----------------------------;
                                    r1 <— r1 + 1; if trap is
                                              ;  released too
                                              ;  early r1 will
                                              ;  be gtr than a
                                              ;  1.
                    ;----------------------------;
                                    r1 <— r1 + 1; if trap is
                                              ;  released too
                                              ;  early r1 will
                                              ;  be gtr than 1
                                              ;  1.
                    ;----------------------------;
                                    r1 <— r1 + 1; if trap is
                                              ;  released too
                                              ;  early r1 will
                                              ;  be gtr than a
                                              ;  1.
                                              .
                                              .
                                              .
                    ;----------------------------;
    more testing eventually if the test finishes
    success will be signaled with TX traffic.
                                          ;entry
                                          ;=
                                    machine.check
                    ;----------------------------;
                                           nop; have some
                                              ;  simple
                                              ;  microcode to
                                              ;  see if r1
```

| MICROCODE PORTION |
|---|
| ; contains a 1. |
| ; If it's a |
| ; zero stalls |
| ; were asserted |
| ; too long if |
| ; it is gtr |
| ; than 1 it was |
| ; released too |
| ; early. If r1 |
| ; has the |
| ; correct |
| ; value, exit |
| ; the trap and |
| ; return |
| ; testing else |
| ; signal error |
| ; to console |
| ; via TX |
| ; traffic |

As is evident from the examples, the cycle counter method uses a minimum amount of console interaction. The key to the cycle counter is the integration of functional, non-dedicated to test, logic. The logic efficiently tests for CPU stall cycles faster than through a test using a greater amount of console interaction. The test time is significantly reduced as the microdiagnostic operates at about 100 Mhz as opposed to 10 khz for the console operation. The invention allows the counter to function as a watchdog for the system by enabling the microdiagnostic to regain control of the machine without console interaction.

What is claimed is:

1. A method for reducing a console's interaction time in performing microdiagnostic tests on a central processing unit, which comprise the steps of:
   (a) maintaining a means to operate microdiagnostic code in the central processing unit, said microdiagnostic code performing tests on the central processing unit;
   (b) loading a means for counting cycles with a value from said microdiagnostic code, said value exceeding the time necessary for performance of the test;
   (c) initializing the means for counting cycles with the microdiagnostic code to begin counting at a cycle when a clock coupled to said central processing unit is deasserted in accordance with said microdiagnostic code;
   (d) counting the number of cycles in said means for counting cycles and causing a machine check trap to occur when the number of cycles equals the previous loaded value, said trap allowing the microsequencer to gain control of the test regardless of any error conditions that are present; and
   (e) performing any necessary diagnostic tests with a diagnostic microcode at the machine check trap location.

2. The method of claim 1 wherein the step of causing a machine check trap comprises the step of generating a signal when the number of cycles equals the previous loaded value, and utilizing said signal to assert said clock and to select a special address input of a multiplexer, the output of said multiplexer being coupled to said means to operate microdiagnostic code, said special address locating said diagnostic microcode.

3. A method according to claim 2 wherein the step of counting with said means for counting is carried out with a counter.

4. An apparatus for reducing a console's interaction time in performing microdiagnostic tests on a central processing unit, the apparatus comprising:
   means for operating microdiagnostic code in the central processing unit, said microdiagnostic code performing tests on the central processing unit;
   means for counting cycles and receiving a value from said means for operating microdiagnostic code, said value exceeding a time necessary for performance of said test;
   means for causing said means for counting to begin counting at a cycle when a clock coupled to said central processing unit is deasserted in accordance with said microdiagnostic code; and
   means for causing a machine check trap to occur when a number of cycles counted equals said value to allow said means for operating microdiagnostic code to gain control of the test regardless of any error conditions that are present.

5. An apparatus according to claim 4 further comprising a diagnostic microcode, said diagnostic microcode performing any necessary diagnostic tests at the machine check trap location.

6. An apparatus according to claim 4 wherein said means for counting cycles is a counter.

7. An apparatus according to claim 4 wherein the means for causing the machine check trap to occur further comprises:
   a signal generated by said counter when the number of cycles counted equals said value, said signal asserting the clock;
   a multiplexer, having a special address input and an output, receiving the signal, said signal selecting the special address input of the multiplexer for output to said means for operating microdiagnostic code.

* * * * *